Jan. 21, 1964  W. G. GRANTHAM  3,118,806
WEFTLESS TAPE AND A METHOD FOR THE MANUFACTURE THEREOF
Filed Sept. 23, 1960
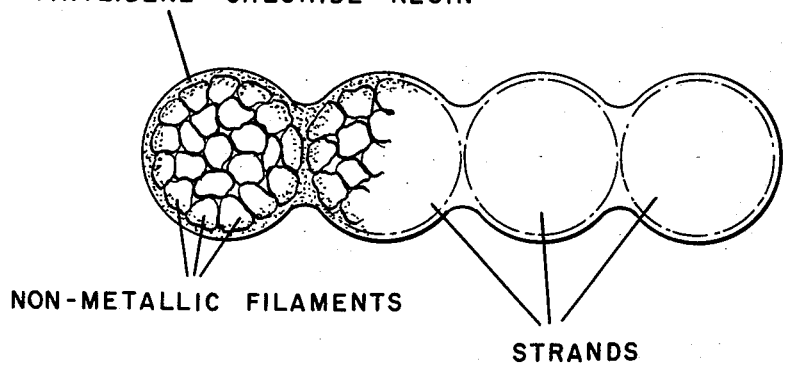

United States Patent Office 3,118,806
Patented Jan. 21, 1964

3,118,806
WEFTLESS TAPE AND A METHOD FOR THE MANUFACTURE THEREOF
William G. Grantham, Wilmington, Del., assignor, by mesne assignments, to FMC Corporation, San Jose, Calif., a corporation of Delaware
Filed Sept. 23, 1960, Ser. No. 57,931
2 Claims. (Cl. 161—143)

This invention relates to weftless tape and a method for the manufacture thereof.

The tapes to which this invention relate are industrial tapes for use in strapping, bundling, unitizing articles such as packages, cartons and crates in place of metal band strapping. Such tapes are normally formed by arranging a number of strands in parallel relation and bonding the strands together by means of a binder composition. The overlapping ends of the tape are normally sealed by means of a crimped metal clip.

One of the problems involved in the production of commercially useful weftless tape of the type described is the formulation of a binder material which provides a tape having the desirable lateral strength, flexibility, and which, at the same time, retains its properties in the presence of moisture. Water-proofness is extremely desirable for tapes used for packages which are to be stored out doors or subjected to unusually moist conditions.

It is an object of this invention to provide a non-metallic weftless tape having improved lateral strength.

It is another object of this invention to provide a non-metallic weftless tape having improved waterproofness.

It is still another object of this invention to provide a weftless tape having sufficient stiffness to permit use in automatic sealing tools and packaging machinery.

It is a further object of this invention to provide a non-metallic weftness tape having sufficient flexibility to permit bending and folding of the tape without cracking or permanent distortion.

Another object of this invention is to provide a method for the manufacture of weftless tape utilizing a liquid binder material having improved processing ability.

In accordance with the present invention a superior weftless tape meeting all of the above objects comprises a plurality of non-metallic flexible strands arranged in close parallel relationship and a binder material comprising a resinous polymer prepared from a major proportion of vinyl chloride and at least 10% by weight of vinylidene chloride, said binder material impregnating, coating and bonding the parallel strands. It is preferred on the basis of expense and binder performance that the binder material comprise a resinous copolymer prepared from about 60 to about 80% by weight of vinyl chloride and from about 40 to about 20% of vinylidene chloride.

The above described weftless tape is much superior to a tape formed, for example, with polyvinyl chloride resin or polyvinylidene chloride resin as the binders. Polyvinyl chloride resin is too brittle to make a satisfactory commercial article and the resin is very difficult to plasticize. Polyvinylidene chloride resin is not sufficiently tough to supply the strength necessary to provide the desired bond between the strands of the tape and from the cost standpoint, it is commercially undesirable. The tape of this invention has superior lateral strength and the desired flexibility and waterproofness for packaging tape to be used out of doors.

The non-metallic flexible strands may include any material such as rayon, natural silk, cotton, asbestos, glass, other artificial cellulosic filaments such as cellulose acetate; synthetic resin filaments such as polyamides, polyesters, Sarans, polyolefins, etc. It is preferred, although not essential, that these strands be about the size and construction of conventional rayon tire cord.

In the accompanying drawing the figure is an enlarged cross sectional view of the preferred weftless tape showing the binder material impregnating, coating and bonding the parallel strands.

Resinous interpolymers prepared with the prescribed proportion of vinyl chloride and vinylidene chloride, and with minor proportions of less than about 10% of other monomers polymerizable therewith are useful as binder materials. Such monomers include for example acrylonitrile, acrylic and methacrylic acids, $C_1$–$C_{18}$ alkyl acrylates and methacrylates, itaconic acid, styrene and methyl vinyl ketone.

Other materials in minor amounts can also be used in the binder material, such as plasticizing agents, coalescing agents, pigments, fillers, and surface modifying agents including clays and waxes.

Plasticizing agents such as trialkyl citrates, particularly acetyl trialkyl citrate; alkyl phthalates, alkyl azelates, mono, di, and polyalkylene glycol dibenzoates, etc. are useful in accordance with this invention.

A coalescing agent found to be particularly useful for the production of the weftless tape which has superior properties is butyl Cellosolve acetate. Generally, plasticizers and coalescing agents are used in amounts ranging from 2.5 to 25% by weight based on the resin.

A method for the manufacture of weftless tape is also a part of this invention. The method comprises treating a plurality of flexible strands in a liquid medium having homogeneously incorporated therein from about 10 to about 75% by weight of a resinous polymer prepared from a major proportion of vinyl chloride and at least 10% by weight of vinylidene chloride, bringing said strands together in parallel relationship on substantially the same plane, and heating the tape to drive off the liquid. Where the solenoid resin has been dispersed in an aqueous medium, additional heating is employed to fuse the resinous particles.

The liquid medium for the method of this invention is preferably water in which the finely divided binder resin is dispersed with or without a dispersing agent. When water is employed as the liquid medium in the process of this invention, the pH of the dispersion should be from about 5 to 10, and preferably about 8, in order to maintain a stable and homogeneous liquid material. The liquid media also include organic solvents and diluents such as tetrahydrofuran, toluene, benzene, xylene, hexane, dioxane, butyl alcohol, butyl acetate, etc. in which the binder resin is dissolved. Other materials which may be incorporated directly in the liquid medium include plasticizing agents, coalescing agents, dispersing agents, pigments, fungicides, surface modifiers such as clays and waxes, in order to produce improved binder properties or for improvement of the binder application to the flexible strands.

The resinous binder material of this invention is normally solid and is homogeneously dispersed or dissolved in the liquid medium by thorough mixing. In a non-solvent medium the finished liquid binder generally contains a major proportion of solids having a particle size of less than about 5 microns and preferably less than 1 micron.

While the amount of the resin which should be incorporated in the liquid medium ranges from 10 to 75% by weight of the total liquid binder, it is preferred when utilizing aqueous dispersions that from about 40 to 60% of the resin be employed so that sufficient binder material will be deposited on the tape during its passage through the liquid binder in a commercially feasible process.

The following examples are set forth to demonstrate the method of this invention and the weftless tape produced.

Example 1

A batch of aqueous binder material comprising an aqueous dispersion of a resinous copolymer of 75% vinyl chloride and 25% vinylidene chloride was prepared. The aqueous dispersion contained 50% solids which had an average particle size of 0.16 micron. The dispersion had a pH of 8, a viscosity at 25° C. of 20 cps. and a specific gravity of 1.195.

The tape was produced by converging into close parallel relationship on the same plane a plurality of two-ply rayon tire cords, each strand having a denier of 1650 and 5 to 6 turns per inch. These cords were run through the aqueous binder material for a distance of about 6 inches at a web speed of approximately 150 ft. per minute. The traveling tape then proceeded through a heat drier which removed water from the binder and fused the resin particles. The tape was then rolled up. On examination the tape produced in this manner was found to have a higher lateral strength than other tapes produced with various vinyl resins and demonstrated very superior resistance to deterioration in the presence of moisture. When submerged in water under stress for at least 48 hours, the recovered tape exhibited no change in lateral strength and no significant loss of other physical properties was noticed.

Example 2

A batch of aqueous binder material was prepared as in Example 1. To this aqueous dispersion 10% by weight of di-2-ethylhexyl azelate, based on the resin, was slowly added with constant agitation.

The tape was formed in the manner set forth in Example 1 which included running the tape through a heat drier over and under a series of rollers. It is noted that the formation of the tape using the aqueous binder material disclosed demonstrated superior cleanliness properties on the rolls of the apparatus so that deposits of the binder material were not formed on these rolls and a cleaner process resulted. The formed tape had improved flexibility and the excellent strength and water resistant characteristics of that formed according to Example 1.

Example 3

A batch of aqueous binder material was prepared in accordance with Example 1. 10% by weight based on the resin of butyl Cellosolve acetate, as a coalescing agent, was slowly added to the aqueous dispersion with constant agitation.

The tape is formed in accordance with the process of Example 1 except that the web speed for the production of the tape is increased from 150 ft. per minute to 300 ft. per minute. The tape produced has excellent flexibility and demonstrates the same strength and water resistant properties as that produced in accordance with Example 1. The coalescing agent facilitates the manufacture of tape by producing "quick grab" conditions in the aqueous binder bath. It also acts as a plasticizing material.

Example 4

A liquid binder material is prepared by dissolving a resinous copolymer of 90% vinyl chloride and 10% vinylidene chloride in a solvent comprising 50 parts tetrahydrofuran and 50 parts toluene to obtain a solution containing 12% resin. Acetyl tributyl citrate is dissolved in this solution in an amount of 14% by weight based on the resin.

A tape was formed by bringing single 500 denier strands of zero twist rayon into close parallel relation on one plane and running the web through a bath of the above binder material for 10 inches at a web speed of 250 ft. per minute. The tape was then dried and rolled up. This tape exhibits excellent strength and moistureproof characteristics.

Various changes and modifications may be made in practicing the invention without departing from the spirit and scope thereof, and therefore, the invention is not to be limited except as defined in the appended claims.

I claim:

1. A method of forming a weftless tape consisting essentially of treating a plurality of flexible strands with an aqueous medium containing in dispersed form from about 10 to about 75% by weight of a resinous polymer of a major proportion of vinyl chloride and at least 10% by weight of vinylidene chloride, a plasticizing amount of a material selected from the group consisting of trialkyl citrates, alkyl phthalates, alkyl azelates and polyalkylene glycol dibenzoates, and a coalescing amount of butyl Cellosolve acetate, bringing said strands together in parallel relationship on substantially the same plane, and drying the formed tape.

2. A weftless high strength packaging tape consisting essentially of high strength twisted cords arranged in close parallel relationship, and a binder material comprising a major proportion of a resinous copolymer of from 60 to 80% of vinyl chloride and from 40 to 20% of vinylidene chloride based on the weight of the copolymer, a plasticizing amount of a material selected from the group consisting of trialkyl citrates, alkyl phthalates, alkyl azelates, and polyalkylene glycol dibenzoates, and a coalescing amount of butyl Cellosolve acetate, said binder material having been applied to the twisted cords from a dispersion in an aqueous medium at a concentration of from about 10 to about 75% by weight.

References Cited in the file of this patent

UNITED STATES PATENTS

| | | |
|---|---|---|
| 2,260,410 | Smith | Oct. 28, 1941 |
| 2,459,955 | Morrison et al. | Jan. 25, 1949 |
| 3,000,853 | Havens | Sept. 19, 1961 |
| 3,028,281 | Karass | Apr. 3, 1962 |

FOREIGN PATENTS

| | | |
|---|---|---|
| 652,005 | Great Britain | Apr. 11, 1951 |
| 757,604 | Great Britain | Sept. 19, 1956 |

OTHER REFERENCES

Prescott et al.: "Modern Plastics," vol. 30, No. 2, October 1952, pages 134, 136, 138, 200 and 201.